Figure 1:
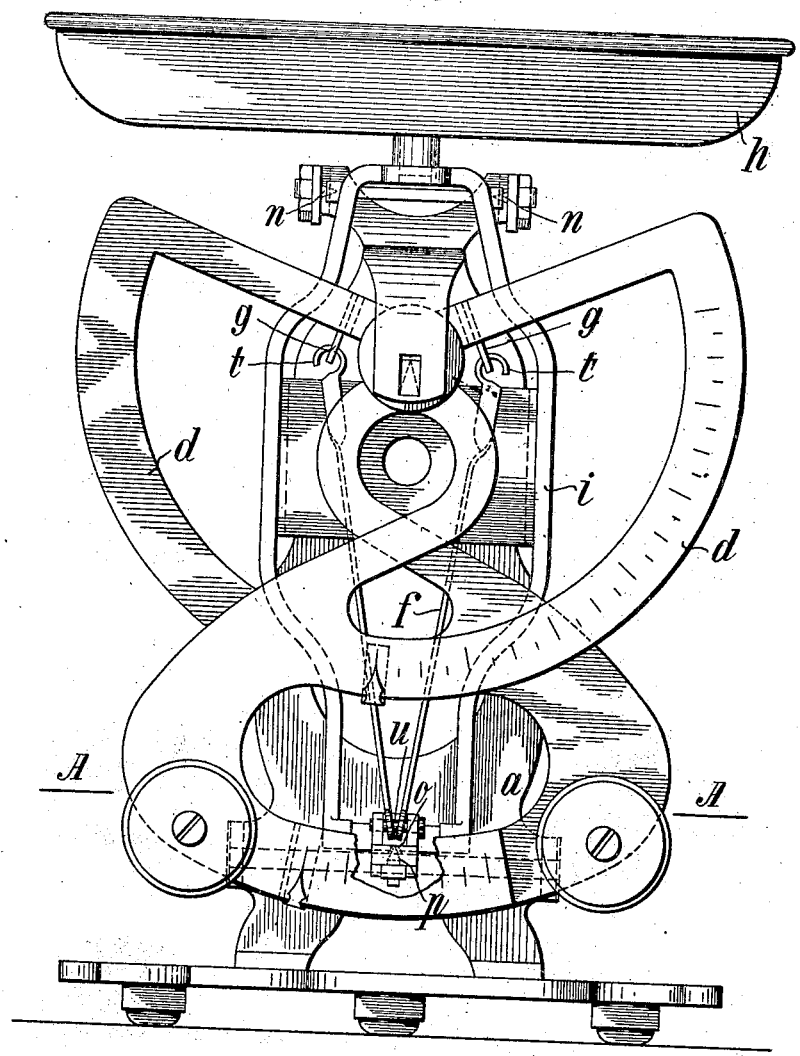

No. 833,922. PATENTED OCT. 23, 1906.
P. FROST.
BALANCE OR WEIGHING APPARATUS OF THE PENDULUM TYPE.
APPLICATION FILED DEC. 21, 1905.

3 SHEETS—SHEET 1.

Witnesses.
Inventor.
Paul Frost.
atty.

No. 833,922. PATENTED OCT. 23, 1906.
P. FROST.
BALANCE OR WEIGHING APPARATUS OF THE PENDULUM TYPE.
APPLICATION FILED DEC. 21, 1905.

3 SHEETS—SHEET 2.

Witnesses.
H. L. Ames.
R. W. Sommers.

Inventor.
Paul Frost.
by Henry Orth Jr. atty.

No. 833,922. PATENTED OCT. 23, 1906.
P. FROST.
BALANCE OR WEIGHING APPARATUS OF THE PENDULUM TYPE.
APPLICATION FILED DEC. 21, 1905.
3 SHEETS—SHEET 3.
Fig. 4.
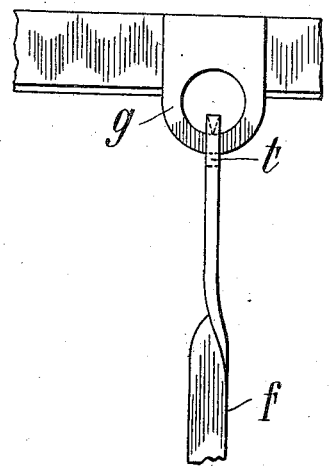
Fig. 5.
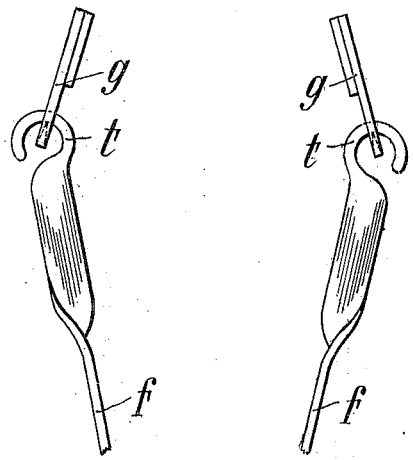
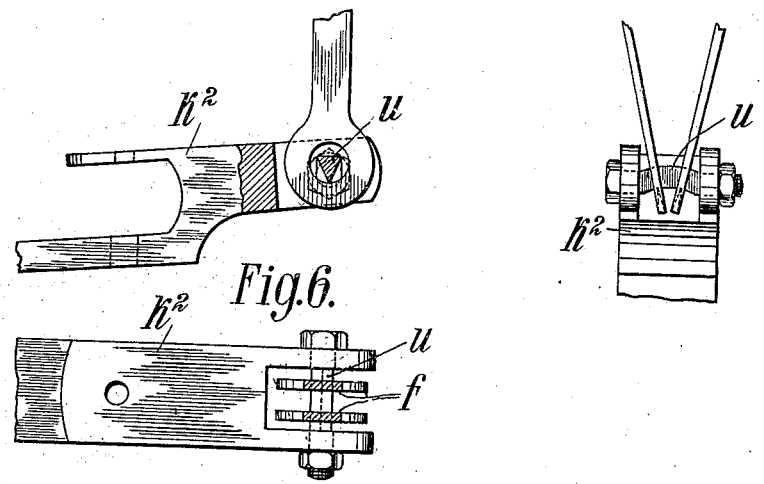
Fig. 6.
Witnesses.
H. L. Amer.
B. Sommers
Inventor.
Paul Frost.
by Henry Orth, atty

UNITED STATES PATENT OFFICE.

PAUL FROST, OF BERLIN, GERMANY.

BALANCE OR WEIGHING APPARATUS OF THE PENDULUM TYPE.

No. 833,922.  Specification of Letters Patent.  Patented Oct. 23, 1906.

Application filed December 21, 1905. Serial No. 292,751.

*To all whom it may concern:*

Be it known that I, PAUL FROST, a subject of the King of Prussia, German Emperor, residing at 187 Friedrichstrasse, in the city of Berlin, Kingdom of Prussia, German Empire, have invented certain new and useful Improvements in Balances or Weighing Apparatus of the Pendulum Type, of which the following is a specification.

This invention relates to improvements in balances or weighing apparatus of the pendulum type, and especially to those employing two pendulums oscillating in opposite directions about the same fulcrum. Hitherto in this special form of balance of the pendulums and other parts have had pin-pivots.

The object of the present invention is to render the balance more accurate; and it consists in providing the pendulums and other moving parts with knife-edge fulcra and in adapting these parts for such fulcra.

Instead of the pan being carried on a rod, as hitherto, it is supported by a frame which rests on one of the points of the lower lever, effecting the parallel guiding. The lower lever is supported on two sides by means of a cross-shaft provided with knife-edges. The upper fork-shaped guiding-lever turns on points both on the frame as well as on the pan-support.

The link-bars engaging on the weight-levers are not connected with the pan-support, as hitherto, but with the lower guiding-lever and engage on the lever by means of a suitably-shaped knife-edge. By connecting the link-bars with the pan rod or support, as hitherto, they have a side movement on the reciprocation of the rod, and are thus liable to jam or bend, which lessens the sensitiveness and accuracy of the apparatus. This disadvantage is overcome by the present invention.

In the drawings a balance or weighing apparatus constructed according to the present invention is shown in one form of construction.

Figure 2:
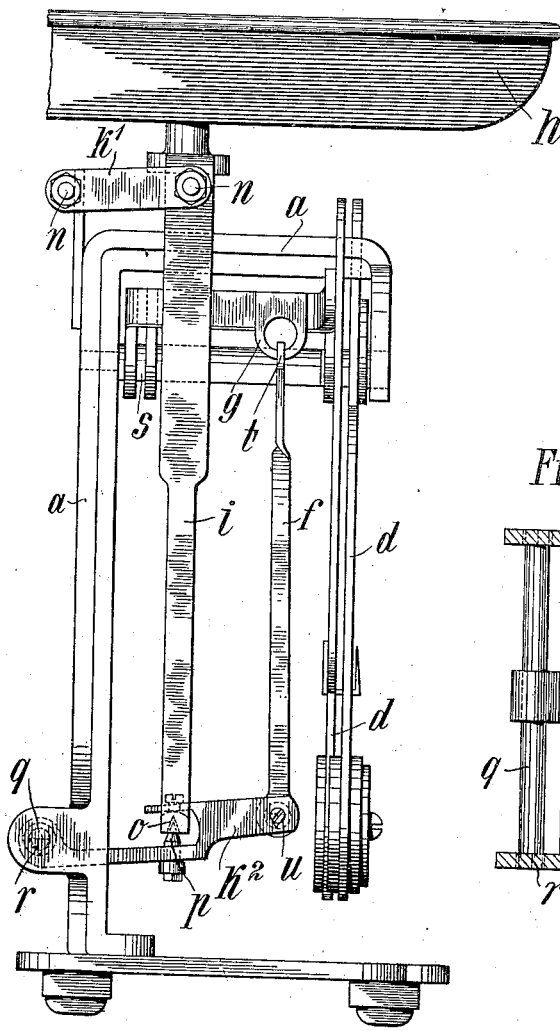
Figure 3:
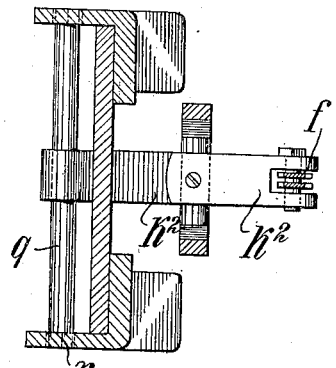

Figure 1 is a front view; Fig. 2, a side view; Fig. 3, a section on the line A A of Fig. 1. Fig. 4 is an enlarged detail view of certain parts as seen in Fig. 2. Fig. 5 is a front view of the parts shown in Fig. 4, and Fig. 6 is a top view of the lower portion of Fig. 4.

The pan $h$ is connected with a frame $i$, which is guided in a parallel manner by means of two levers $k'$ and $k^2$. Both the cheeks of the upper approximately H-shaped lever $k'$ engage at one end with points or centers $n$ on the frame $i$ and at the other with points or centers $n$ on the frame $a$. By means of this arrangement of centers or point-bearings an exceptionally easy movement with great accuracy is obtained, and any wearing away can at any time be made so as not to affect to any appreciable extent the sensitiveness or accuracy of the apparatus.

The frame $i$ is fitted at its lower end with a conical cup $o$, which rests on a center or point $p$, arranged on the lower guiding-lever $k^2$. The lever $k^2$ is supported by means of knife-edges $r$, provided on the cross-shaft $q$ and resting in bearings in the frame $a$. Both the weight-levers or pendulums $d$ oscillate on knife-edges $s$ on the frame $a$ and are connected with the lower guide-lever $k^2$ by means of links $f$. The upper end of the links are formed as hooks $t$, provided with knife-edges engaging in eyes $g$, also provided with knife-edges. The lower ends of the links are formed with eyes which are provided with knife-edges surrounding a curved knife-edge $u$ on the lower lever $k^2$, whereby the links can turn freely and frictionless in any required direction.

Having thus described my invention, what I claim as new, and desire to secure by Letters Patent, is—

1. A weighing apparatus comprising a scale-pan, two quadrant pendulums, a common fulcrum for the latter, a frame supporting the pan having a concave bearing-surface, a guide-lever, a pin thereon engaging said bearing-surface and means connecting the guide-lever and pendulums.

2. A weighing apparatus comprising a scale-pan, two quadrant pendulums, a common fulcrum for the latter, a frame having a conical cup in its lower part, a guide-lever beneath the frame, a pin thereon taking into said cup and means connecting the guide-lever and pendulums.

3. A weighing apparatus comprising a scale-pan, two quadrant pendulums, a common fulcrum for the latter, a frame supporting the pan, a guide-lever supporting the frame, a curved knife-edge on said lever, a pair of links connecting the lever and pendulums having eyes in their lower ends provided with knife-edges resting on the knife-edge of the lever.

4. A weighing apparatus comprising a main frame, knife-edges thereon, a guide-lever on each knife-edge, a scale-pan, a frame supporting the latter, pivot-points for connecting the frame to one guide-lever, a cup on the lower end of the frame, a center-pin on the other guide-lever taking into the cup, two quadrant pendulums, a knife-edge fulcrum therefor, links connected with said pendulums having knife-edges in their lower ends, and a knife-edge on the lower guide-lever supporting the knife-edges of the links.

5. A weighing apparatus comprising a scale-pan, weighted pendulums, a common fulcrum for the latter, a frame supporting the pan surrounding the fulcrum, a guide-lever supporting the frame, and means connecting the guide-lever and pendulums.

In witness whereof I have hereunto signed my name in the presence of two subscribing witnesses.

PAUL FROST.

Witnesses:
   JOHANNES HEIN,
   WOLDEMAR HAUPT.